(12) United States Patent
Wang et al.

(10) Patent No.: US 11,672,002 B2
(45) Date of Patent: Jun. 6, 2023

(54) DEVICE-TO-DEVICE COMMUNICATION ACROSS MULTIPLE CELLS

(71) Applicant: QUALCOMM Incorporated, San Diego, CA (US)

(72) Inventors: Hua Wang, Basking Ridge, NJ (US); Junyi Li, Fairless Hills, PA (US); Piyush Gupta, Bridgewater, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/319,456

(22) Filed: May 13, 2021

(65) Prior Publication Data

US 2021/0377967 A1 Dec. 2, 2021

Related U.S. Application Data

(63) Continuation of application No. 16/155,595, filed on Oct. 9, 2018, now Pat. No. 11,019,641.

(Continued)

(51) Int. Cl.
*H04W 72/542* (2023.01)
*H04W 76/14* (2018.01)
(Continued)

(52) U.S. Cl.
CPC ........ *H04W 72/542* (2023.01); *H04L 5/0037* (2013.01); *H04L 5/0048* (2013.01);
(Continued)

(58) Field of Classification Search
CPC ............ H04W 72/1231; H04W 72/04; H04W 72/085; H04W 72/1268; H04W 76/10;
(Continued)

(56) References Cited

U.S. PATENT DOCUMENTS 11,019,641 B2   5/2021  Wang et al.
2011/0275382 A1*  11/2011  Hakola ............... H04W 24/10
                                                   455/452.2

(Continued)

FOREIGN PATENT DOCUMENTS

WO   2015126843 A1   8/2015
WO   2016209467 A1   12/2016

OTHER PUBLICATIONS

International Search Report and Written Opinion—PCT/US2018/055291—ISA/EPO—dated Dec. 17, 2018.

*Primary Examiner* — Ricky Q Ngo
*Assistant Examiner* — Stephen N Steiner
(74) *Attorney, Agent, or Firm* — Loza & Loza, LLP

(57) ABSTRACT

Base stations of neighbor cells can coordinate with each other in allocating grant-free uplink (GUL) resources for a device-to-device (D2D) connection or channel between user equipments (UEs) across the neighbor cells. The base stations coordinate to determine a condition conducive to D2D communication between the UEs. If the condition exists, the base stations coordinate to allocate network resources for D2D communication between the UEs, and establish a D2D connection between the UEs using the allocated network resources for D2D communication.

18 Claims, 11 Drawing Sheets

Related U.S. Application Data

(60) Provisional application No. 62/582,813, filed on Nov. 7, 2017.

(51) Int. Cl.
*H04W 72/1268* (2023.01)
*H04L 5/00* (2006.01)
*H04W 72/04* (2023.01)
*H04W 76/10* (2018.01)
*H04W 92/18* (2009.01)

(52) U.S. Cl.
CPC ....... *H04W 72/04* (2013.01); *H04W 72/1268* (2013.01); *H04W 76/10* (2018.02); *H04W 76/14* (2018.02); *H04L 5/0051* (2013.01); *H04W 92/18* (2013.01)

(58) Field of Classification Search
CPC ..... H04W 76/14; H04W 92/18; H04W 72/12; H04L 5/0037; H04L 5/0048; H04L 5/0051
See application file for complete search history.

(56) References Cited

U.S. PATENT DOCUMENTS

| | | | |
|---|---|---|---|
| 2013/0322388 A1 | 12/2013 | Ahn et al. | |
| 2014/0023008 A1* | 1/2014 | Ahn | H04W 72/23 370/329 |
| 2015/0358981 A1* | 12/2015 | Chae | H04W 4/70 370/252 |
| 2018/0139773 A1* | 5/2018 | Ma | H04L 5/0037 |

\* cited by examiner

DEVICE-TO-DEVICE COMMUNICATION ACROSS MULTIPLE CELLS

PRIORITY CLAIM

This application is a continuation of U.S. patent application Ser. No. 16/155,595 filed Oct. 9, 2018, which claims priority to U.S. provisional patent application No. 62/582,813 filed Nov. 7, 2017, the content of each application is incorporated herein by reference as if fully set forth below in its entirety and for all applicable purposes.

TECHNICAL FIELD

The technology discussed below relates generally to wireless communication systems, and more particularly, to wireless communication using device-to-device communication across different cells.

INTRODUCTION

Some wireless communication systems employ multiple-access technologies capable of supporting communication with multiple users by sharing available system resources. Some examples of system resources are bandwidth, subcarriers, time slots, transmit power, antennas, etc. In a shared resource network, a user equipment (UE) may transmit data using a request-grant method (also known as grant-based method) in that the UE requests a permission or grant from the network prior to transmitting data, and a base station or scheduling entity decides when and how the UE may transmit its information/data using granted or scheduled network resources (e.g., time, spatial, and/or frequency resources).

When a UE transmits data without first requesting a grant of network resources from a base station or scheduling entity, such data transmission may be called grant-less or grant-free traffic in this disclosure. In some wireless communication systems, a cellular network enables wireless devices (e.g., UEs) to communicate with each other by signaling with a nearby base station or cell. In some networks, wireless devices may communicate with one another directly, rather than via an intermediary base station, scheduling entity, or cell. This type of direct communication between UEs may be called device-to-device (D2D) or peer-to-peer (P2P) communication. When D2D connections use grant-less resources for communication, interference between the D2D connections and/or interference between a D2D connection and an uplink/downlink connection may occur.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a method of establishing device-to-device (D2D) wireless communication across a first cell and a second cell. The method includes receiving, at a first user equipment (UE) in the first cell, a sounding reference signal (SRS) configuration that is identified by a first scheduling entity of the first cell in coordination with a second scheduling entity of the second cell. The SRS configuration is configured to indicate grant-free uplink (GUL) resources available to a second UE of the second cell. The method further includes measuring an SRS transmitted by the second UE using the GUL resources according to the SRS configuration. The method further includes transmitting a measurement report of the SRS to the first scheduling entity of the first cell, for determining a condition conducive to D2D communication between the first UE and the second UE using the GUL resources.

Another aspect of the disclosure provides a first UE of a first cell for wireless communication. The first UE includes a communication interface configured for wireless communication, a memory, and a processor coupled with the communication interface and the memory. The processor and the memory are configured to receive an SRS configuration that is identified by a first scheduling entity of the first cell in coordination with a second scheduling entity of a second cell. The SRS configuration is configured to indicate GUL resources available to a second UE of the second cell. The processor and the memory are further configured to measure an SRS transmitted by the second UE using the GUL resources according to the SRS configuration. The processor and the memory are further configured to transmit a measurement report of the SRS to the first scheduling entity of the first cell, for determining a condition conducive to D2D communication between the first UE and the second UE using the GUL resources.

These and other aspects of the invention will become more fully understood upon a review of the detailed description, which follows. Other aspects, features, and examples of the present invention will become apparent to those of ordinary skill in the art, upon reviewing the following description of specific, exemplary implementations of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In a similar fashion, while exemplary implementations may be discussed below as device, system, or method examples, it should be understood that such examples can be implemented in various devices, systems, and methods.

DETAILED DESCRIPTION

Figure 1:
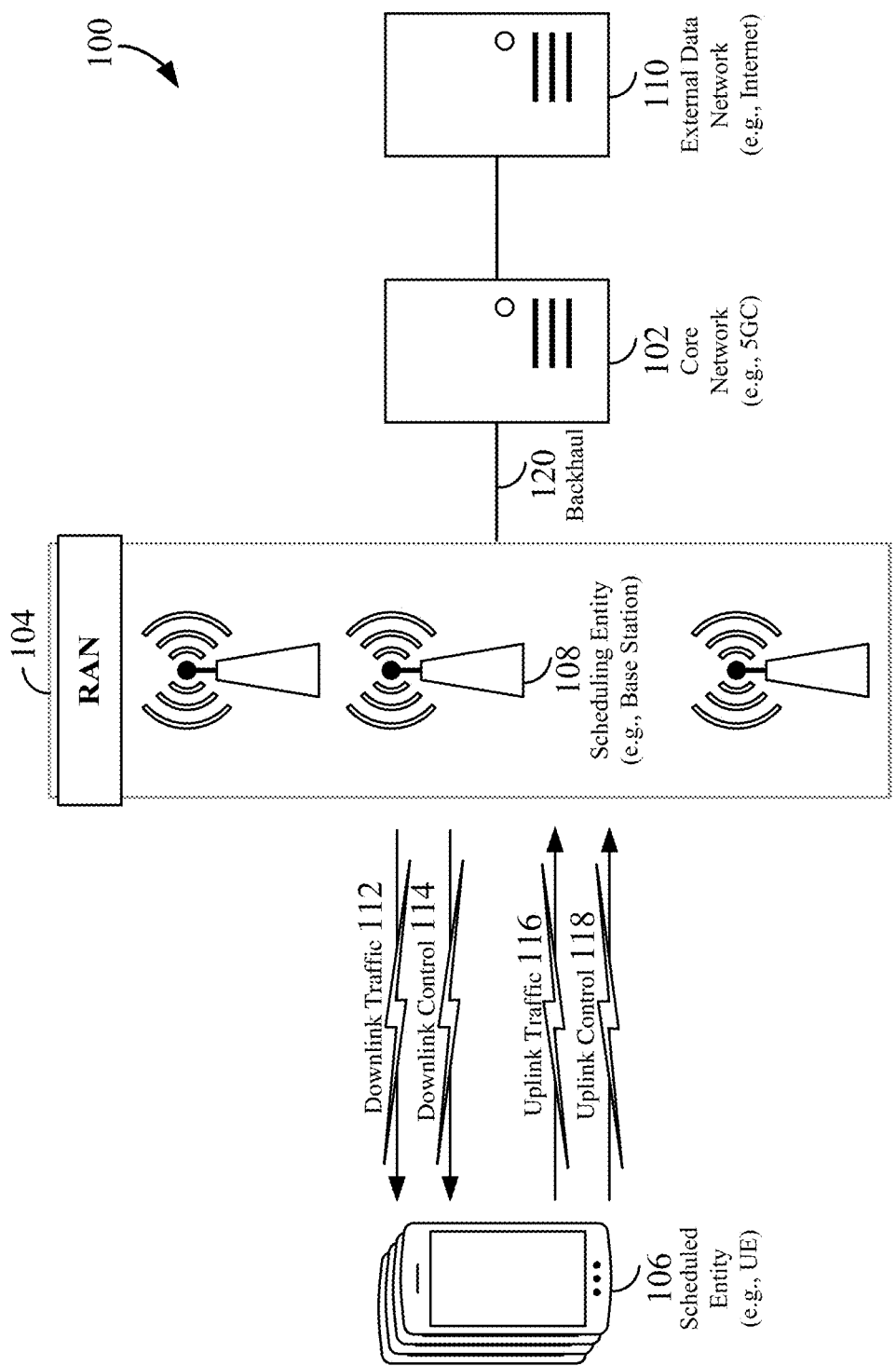
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In cellular communication networks, wireless devices generally communicate with each other via one or more network entities such as a base station or scheduling entity. Some networks may additionally or alternatively support device-to-device (D2D) communication that enables discovery of, and communication with nearby devices using a direct peer-to-peer link between the devices (i.e., without passing through a base station, scheduling, relay, or other node). D2D communication can enable mesh networks and device-to-network relay functionality. Some examples of D2D technology include Bluetooth, Wi-Fi Direct, Miracast, and LTE Direct. D2D communication may also be called point-to-point (P2P) or sidelink communication.

D2D communication may be implemented using licensed or unlicensed frequency bands. Using D2D communication can avoid the overhead involving the routing to and from the base station or scheduling entity. Therefore, D2D communication may provide better throughput, lower latency, and/or higher energy efficiency. MuLTEFire is an example of Long-term Evolution (LTE) network that can support D2D communication using unlicensed frequency bands. MuLTEFire is a $3^{rd}$ Generation Partnership Project (3GPP) specification that defines how LTE operates in unlicensed and shared spectrum while ensuring fair sharing of spectrum with other users and technologies. For example, MuLTEFire may be used in any unlicensed spectrum where there is contention for use of the spectrum. MuLTEFire implements a listen-before-talk (LBT) strategy for coexistence management.

Aspects of the present disclosure provide methods and apparatuses for performing D2D communication across neighbor cells. In some examples, D2D communication across different cells may be configured to use grant-free uplink (GUL) resources. When a user equipment (UE) transmits data without first requesting a grant of certain network resources from a base station or scheduling entity, such data transmission may be called grant-less or grant-free traffic in this disclosure. In some aspects of the disclosure, the base stations of neighbor cells can coordinate with each other in allocating GUL resources for a D2D connection or channel between UEs across the cells.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs or scheduled entities (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
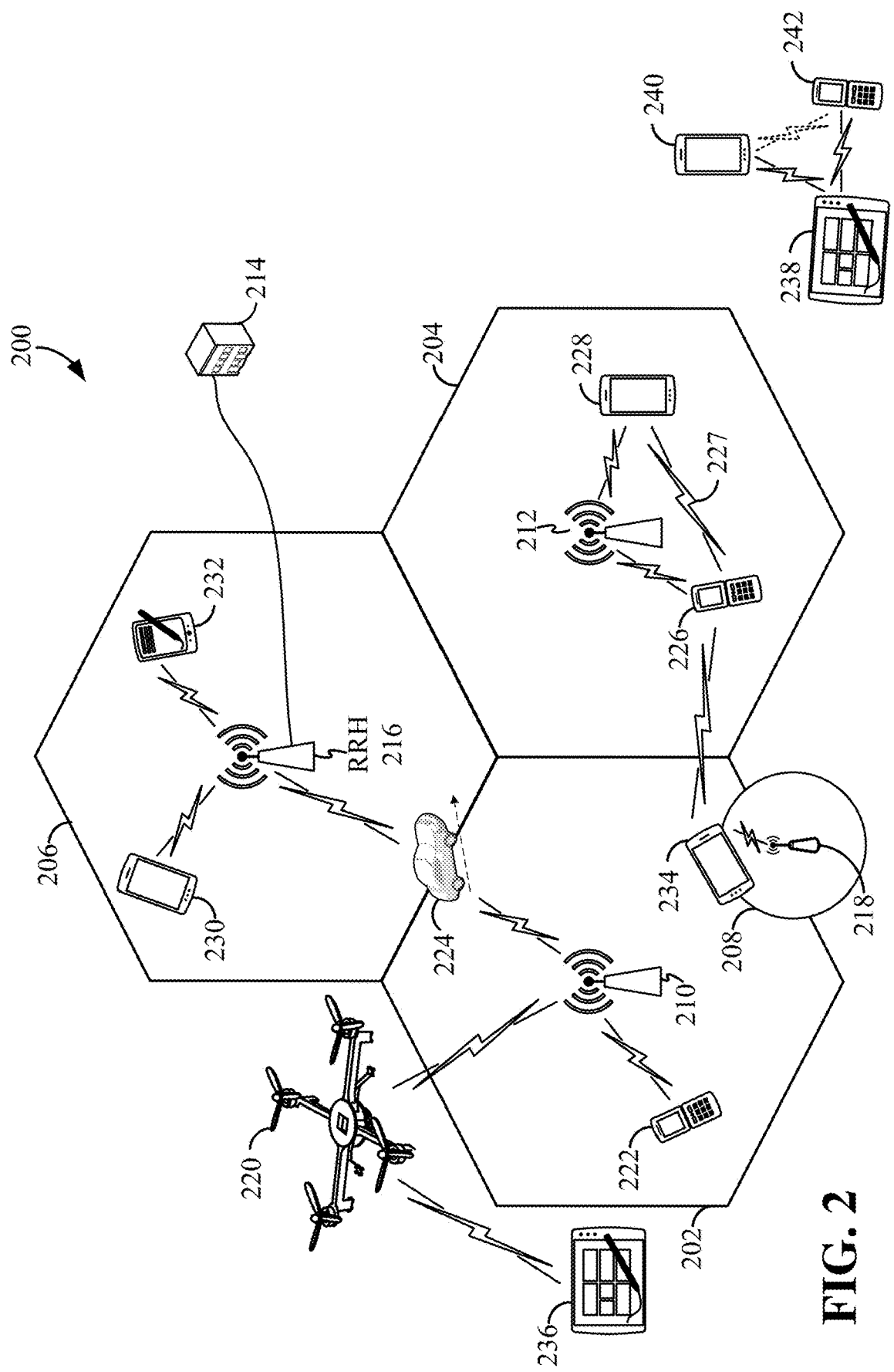
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P), D2D, or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, two UEs (e.g., UEs 226 and 234) may communicate with each other via a D2D channel that is established via neighbor cells (e.g., cells 202 and 204) coordination. In some aspects of the disclosure, the base stations or scheduling entities (e.g., base stations 210 and 212) coordinate to allocate grant-free uplink (GUL) resources to D2D communication across cells.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access. In one example, the radio access network 200 may support MuLTEFire using licensed or unlicensed spectrum.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In some aspects of the disclosure, user data may be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration of time (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for wireless communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe (e.g., 1 ms subframe 302) may consist of one or multiple adjacent slots. In the example shown in FIG. 3, one subframe 302 includes four slots 310, as an illustrative example. An expanded view of one of the slots 310 illustrates the slot 310 including a control region 312 and a data region 314. In general, the control region 312 may carry control channels (e.g., PDCCH or PUCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
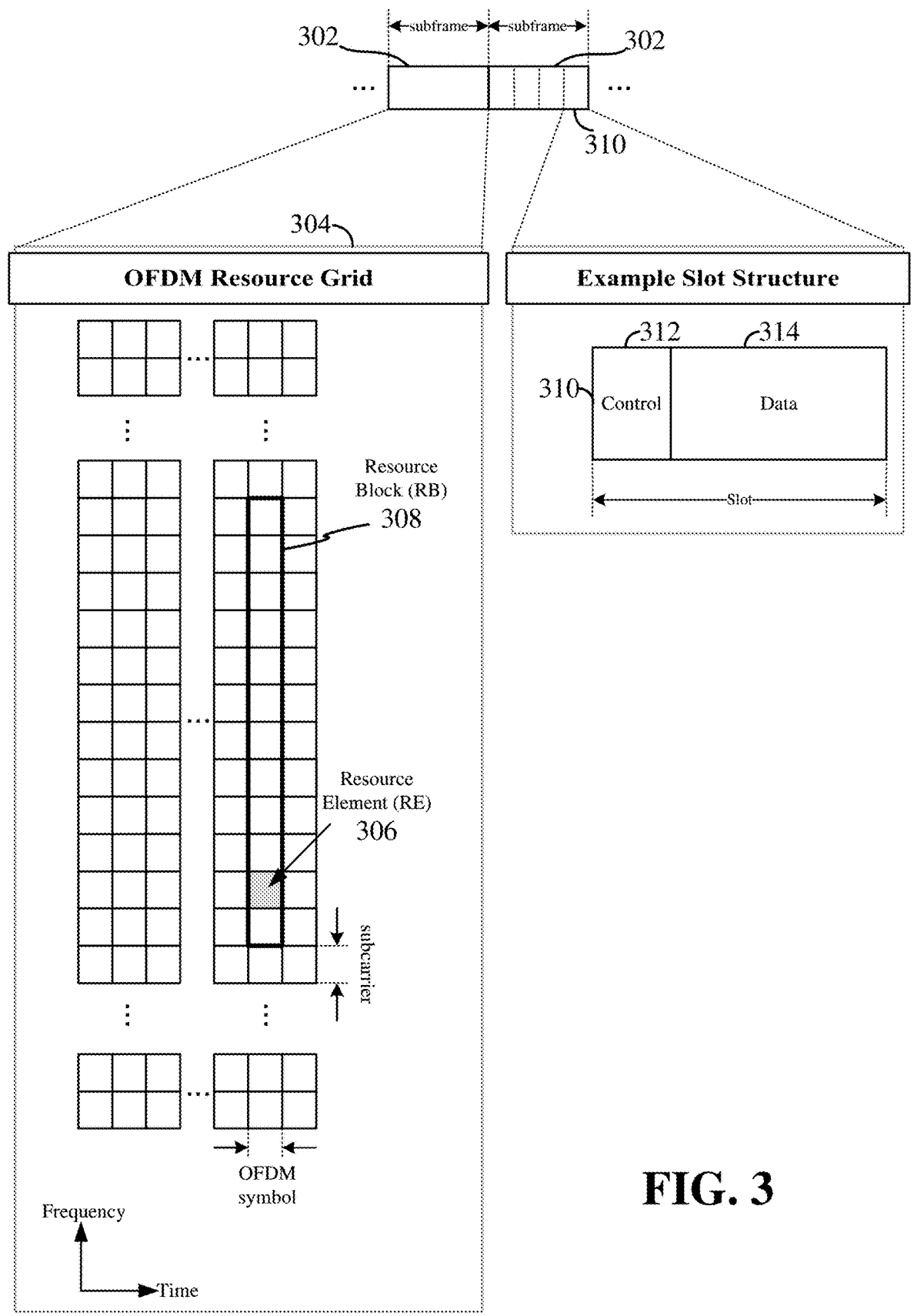
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc. The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 306 to carry UL control information 118 originating from higher layers via one or more UL control channels, such as a physical uplink control channel (PUCCH) or short PUCCH, a physical random access channel (PRACH), etc., to the scheduling entity 108. A sPUCCH generally has fewer symbols than a PUCCH. Further, UL REs may carry UL physical signals that generally do not carry information originating from higher layers, such as demodulation reference signals (DM-RS), phase-tracking reference signals (PT-RS), sounding reference signals (SRS), etc. In addition to control information, one or more REs 306 (e.g., within the data region 314) may be allocated for user data or traffic data. Such traffic may be carried on one or more traffic channels, such as, for a DL transmission, a physical downlink shared channel (PDSCH), for an UL transmission, a physical uplink shared channel (PUSCH), or D2D communication or sidelink data between UEs.

Thus, in a wireless communication network with scheduled access to time-frequency resources and having a cellular configuration, a D2D configuration, a P2P configuration, or a mesh configuration, a scheduling entity and one or more scheduled entities may communicate utilizing the scheduled resources. The network 200 may also provide grant-free uplink (GUL) access to the UEs. GUL resources (e.g., RB 308) may be allocated to the UEs in the frequency domain, time domain, and/or spatial domain for regular UL access and/or D2D communication. In some examples, the base station may allocate certain subframes or slots in which GUL traffic is allowed. Different UEs may be allocated different GUL subframes or slots to avoid collision or interference. In some examples, the base station may allocate certain frequency bands in which grant-free traffic is allowed. In some examples, the base station may allocate certain MIMO or spatial layer(s) in which grant-free traffic is allowed. The base station may activate or release GUL resources using semi-static control (e.g., RRC signaling or high layer messages) or dynamic control (e.g., downlink control information (DCI) in a downlink control channel). When a UE needs to transmit GUL data, the UE may use a listen-before-talk (LBT) procedure to determine that the GUL channel or resource is available.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
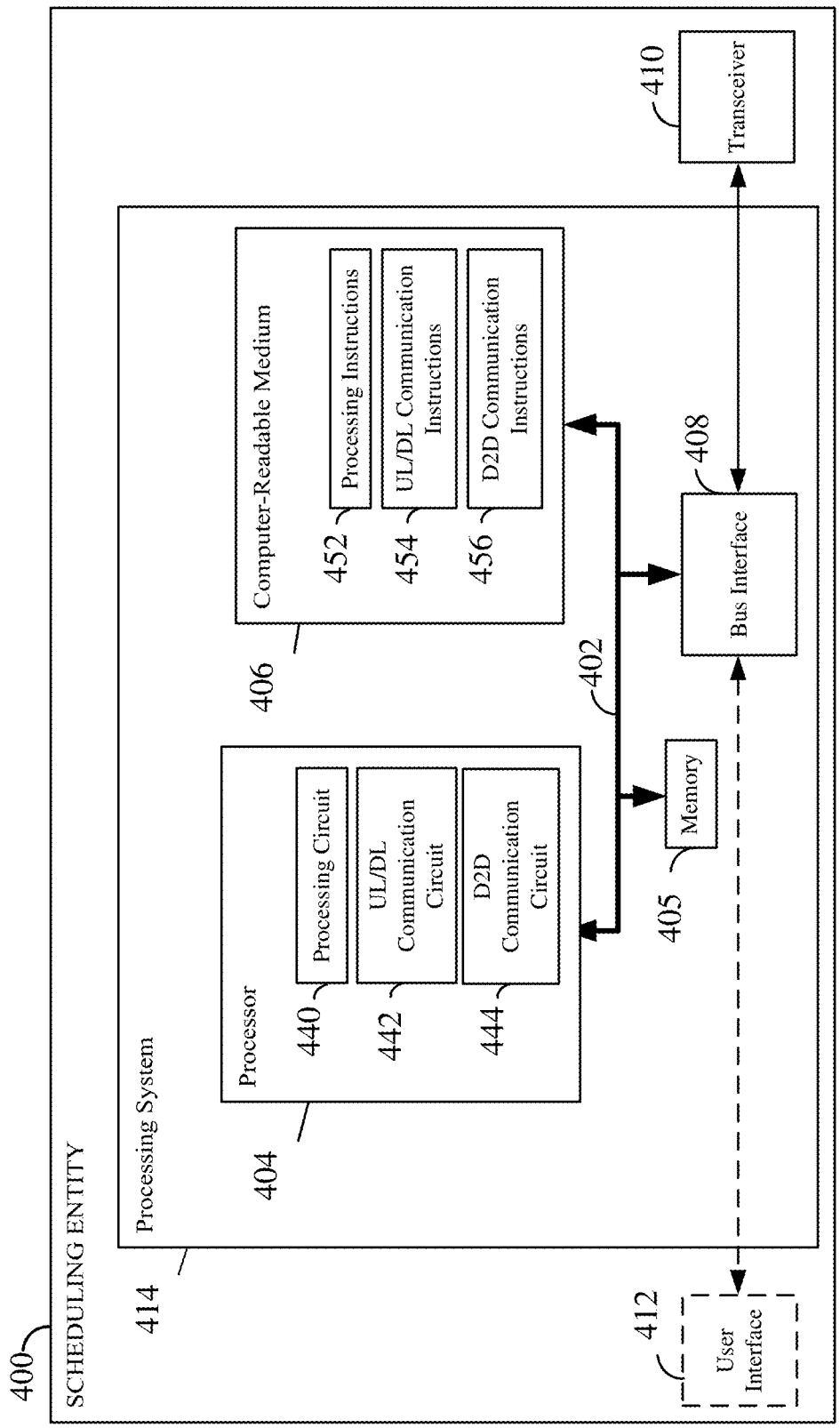
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1, 2, 6, 7, 8, and/or 9. In another example, the scheduling entity 400 may be a base station as illustrated in any one or more of FIGS. 1, 2, 6, 7, 8, and/or 9.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 6-11.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include circuitry configured for various functions, including, for example, functions for configuring and performing cross-cell D2D communication. For example, the circuitry may be configured to implement one or more of the functions described in relation to FIGS. 6-11. The processor 404 may include, for example, a processing circuit 440, a UL/DL communication circuit 442, and a D2D communication circuit 444. The processing circuit 440 may be configured to perform various data processing and logic functions that may be used in wireless communication. The UL/DL communication circuit 442 may be configured to perform various functions used in UL and DL communications, for example, encoding/decoding, resource mapping, data packet encapsulation/decapsulation, interlacing/deinterlacing, interleaving/deinterleaving, multiplexing/demultiplexing, etc. The D2D communication circuit 444 may be configured to perform various functions used in cross-cell D2D communication, for example, D2D channel measurements, D2D communication resource allocation, D2D channel configuration, etc. The UL/DL communication 442 and D2D communication circuit 444 may be included in a communication circuit.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include software configured for various functions, including, for example, functions for configuring and performing cross-cell D2D communication. For example, the software may be configured to implement one or more of the functions described in relation to FIGS. 6-11. The software may include processing instructions 452, UL/DL communication instructions 454, and D2D communication instructions 456. The processing instructions 452 may configure the processing system 414 to perform various data processing and logic functions that may be used in wireless communication. The UL/DL communication instructions 454 may configure the processing system 414 to perform various functions used in UL and DL communications, for example, encoding/decoding, resource mapping, data packet encapsulation/decapsulation, interlacing/deinterlacing, interleaving/deinterleaving, multiplexing/demultiplexing, etc. The D2D communication instructions 456 may configure the processing system 414 to perform various functions used in cross-cell D2D communication, for example, D2D channel measurements, D2D communication resource allocation, D2D channel configuration, etc.

Figure 5:
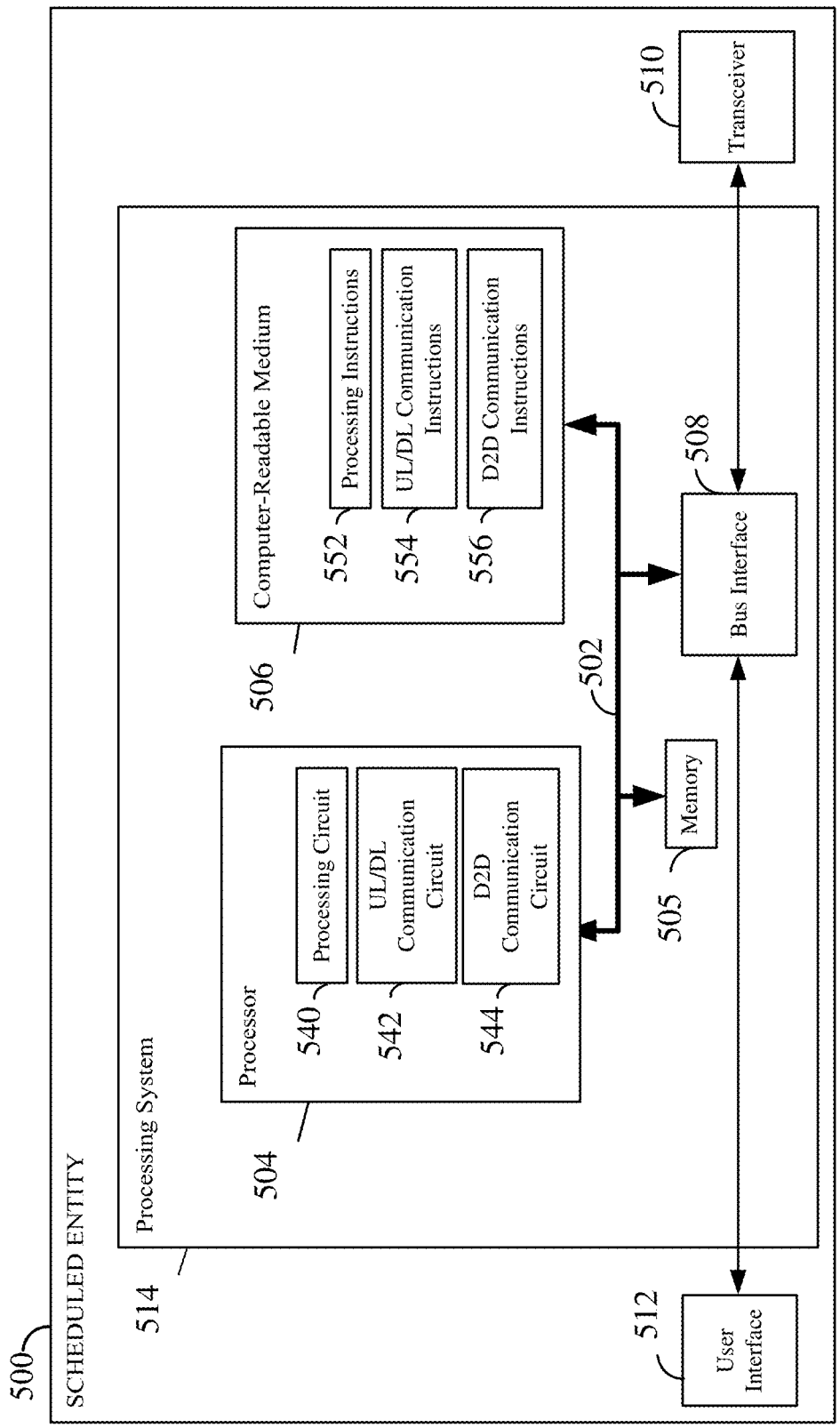
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, 6, 7, 8, and/or 9.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described and illustrated in FIGS. 6-11.

In some aspects of the disclosure, the processor 504 may include circuitry configured for various functions, including, for example, functions for configuring and performing cross-cell D2D communication. For example, the circuitry may be configured to implement one or more of the functions described in relation to FIGS. 6-11. The processor 504 may include a processing circuit 540, a UL/DL communication circuit 542, and a D2D communication circuit 544. The processing circuit 540 may be configured to perform various data processing and logic functions that may be used in wireless communication. The UL/DL communication circuit 542 may be configured to perform various functions used in UL and DL communications, for example, encoding/decoding, resource mapping, data packet encapsulation/decapsulation, interlacing/deinterlacing, interleaving/deinterleaving, multiplexing/demultiplexing, etc. The D2D communication circuit 544 may be configured to perform various functions used in cross-cell D2D communication, for example, D2D channel measurements, D2D communication resource allocation, D2D channel configuration, etc.

In one or more examples, the computer-readable storage medium 506 may include software configured for various functions, including, for example, functions for configuring and performing cross-cell D2D communication. For example, the software may be configured to implement one or more of the functions described in relation to FIGS. 6-11. The software may include processing instructions 552, UL/DL communication instructions 554, and D2D communication instructions 556. The processing instructions 552 may configure the processing system 514 to perform various data processing and logic functions that may be used in wireless communication. The UL/DL communication instructions 554 may configure the processing system 514 to perform various functions used in UL and DL communications, for example, encoding/decoding, resource mapping, data packet encapsulation/decapsulation, interlacing/deinterlacing, interleaving/deinterleaving, multiplexing/demultiplexing, etc. The D2D communication instructions 556 may configure the processing system 514 to perform various functions used in cross-cell D2D communication, for example, D2D channel measurements, D2D communication resource allocation, D2D channel configuration, etc.

Figure 6:
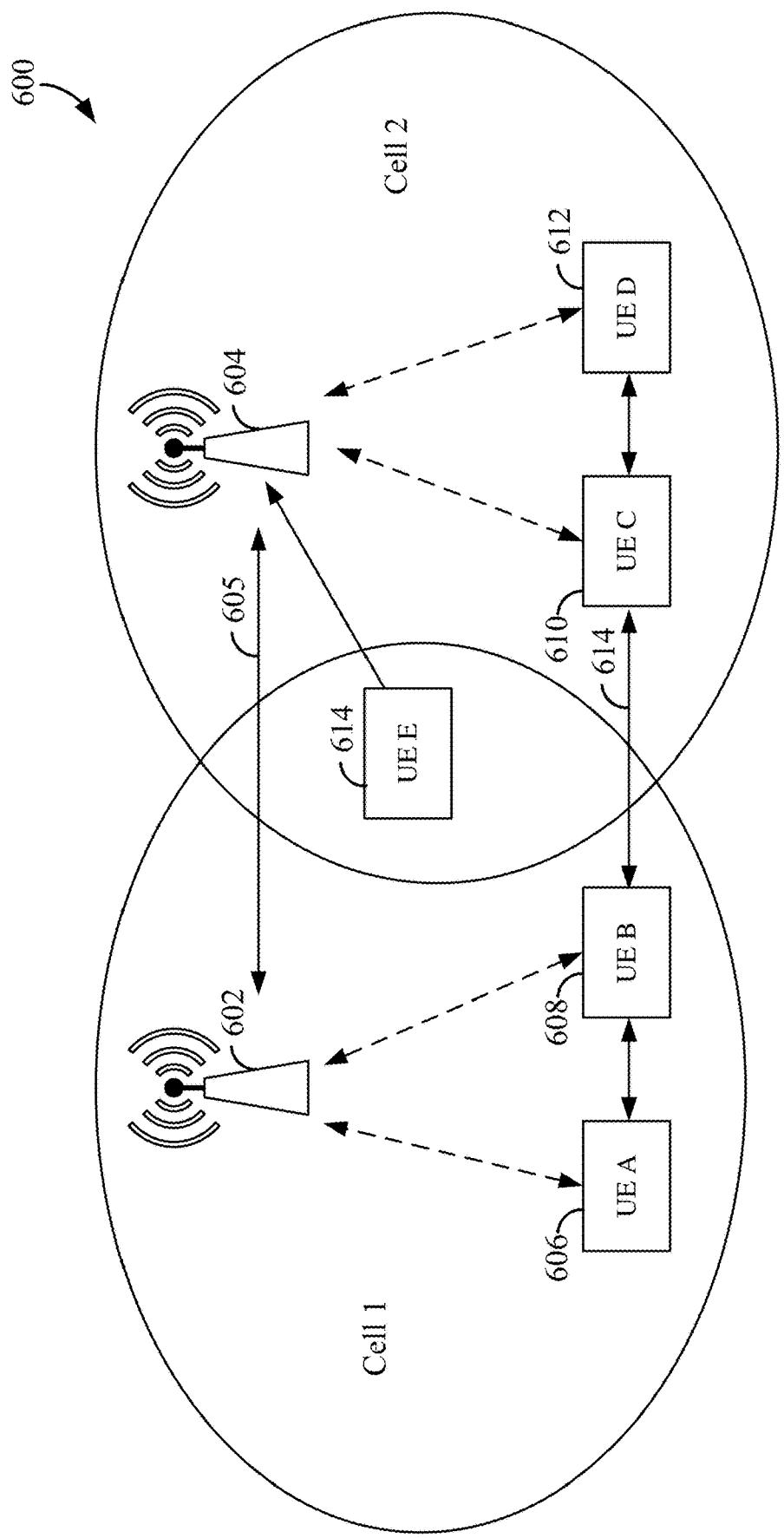
FIG. 6 is a diagram illustrating some examples of device-to-device (D2D) communication in a wireless network according to some aspects of the present disclosure.

FIG. 6 is a diagram illustrating some examples of D2D communication in a wireless network 600 according to some aspects of the present disclosure. The wireless network 600 may be the same as the network 200 illustrated in FIG. 2. Two exemplary cells (e.g., cell 1 and cell 2) are shown in FIG. 6. In a first cell (cell 1), a first base station 602 can allocate certain network resources to the UEs (e.g., UE A 606 and UE B 608) located in the first cell for D2D communication. In a second cell (cell 2), a second base station 604 can allocate certain network resources to the associated UEs (e.g., UE C 610 and UE D 612) for D2D communication. In some examples, the resources allocated for D2D communication may be grant-free uplink (GUL) resources. The first base station 602 and second base station 604 may communicate with each other via a wireless or wired backhaul connection 605 directly or via another network entity (not shown). The base stations and UEs may be similar to those illustrated in FIGS. 1 and 2. For example, UE A and UE B may communicate with each other using a D2D connection in cell 1, and UE C and UE D may communicate with each other using a D2D connection in cell 2. In some examples, the base stations may allocate certain GUL resources (e.g., RB 308) to regular UL traffic (e.g., uplink from UE E 614). In some aspects of the disclosure, UEs (e.g., UE B and UE C) that are located in different cells may be in proximity such that the UEs can communicate using a cross-cell D2D connection 614.

In some aspects of the disclosure, the base stations 602 and 604 may use D2D-channel measurements to facilitate and support D2D connection setup, interference management between D2D connections, and mobility. In some example, a base station may configure its associated UEs to perform D2D-channel measurements based on reference signals transmitted by another UE of a different cell. In some examples, a UE may transmit a sounding reference signal (SRS) aperiodically, e.g., on request from a base station or scheduling entity (e.g., eNB or gNB), utilizing a PUCCH, sPUCCH, physical uplink shared channel (PUSCH), or any other suitable channel. A UE can measure the SRS transmitted by another UE to measure a D2D connection or channel between the UEs. For example, the base station 602 may request UE A to transmit an aperiodic SRS in an upcoming sPUCCH. If UE A is already transmitting UL traffic, UE A may transmit an aperiodic SRS in its PUSCH. In some aspects of the disclosure, all UE transmissions may be scheduled by the base station. The base station can control the timing and resources used by the UE to transmit UL traffic and SRS to avoid conflict. When UE A transmits an aperiodic SRS, the base station 602 requests other UEs (e.g., UE B and UE E) in its cell to monitor UE A's SRS in the upcoming sPUCCH/PUSCH and report the measurements back to the base station 602. The base station 602 can provide UE A's SRS parameters (e.g., allocated network resources) to the other UEs to avoid transmission-reception conflicts among the UEs in the same cell. In cell 1, the base station 602 can rotate SRS transmissions among the UEs in its cell to perform the D2D measurements for different potential D2D connections or channels. Similarly, the neighbor base station 604 can perform D2D measurements using its UEs (e.g., UE C 610 and UE D 612) in cell 2 using SRS. In some examples, the base stations may schedule the UEs to transmit the SRS using GUL resources.

Figure 7:
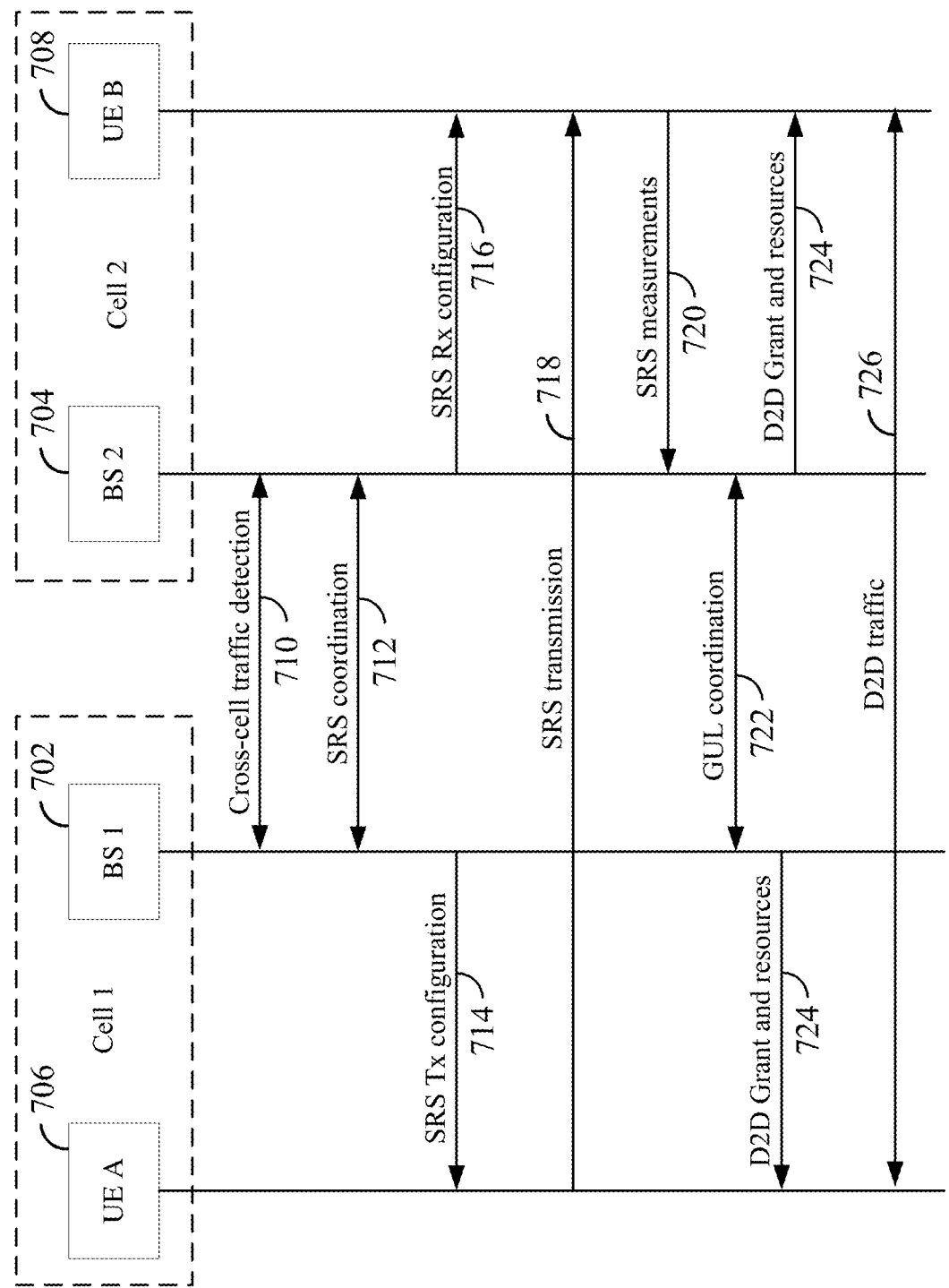
FIG. 7 is a diagram illustrating a process for setting up a cross-cell D2D connection using GUL resources according to some aspects of the disclosure.

FIG. 7 is a diagram illustrating a process for setting up a cross-cell D2D connection according to some aspects of the disclosure. Two exemplary base stations (e.g., BS 1 702 and BS 2 704) of neighbor cells can coordinate in setting up a D2D connection between UEs (e.g., UE A 706 and UE B 708) located in different cells (e.g., cell 1 and cell 2). These base stations and UEs may be the same as those illustrated in any of FIGS. 1, 2, and 6.

Referring to FIG. 7, the base stations (BS1 and BS2) may detect 710 that UE A and UE B have inter-cell communication based on network traffic or desire to desire communication. At this point, UE A and UE B may communicate with each other via their respective base stations, for example, using regular UL and DL connections, not D2D connection. By this UL/DL traffic, BS1 and BS2 can determine that there is inter-cell communication between the UEs. Because BS-based communication involves certain overhead, communication between the UEs may be more resource efficient if the UEs use D2D communication. To set up a D2D connection between the UEs, BS1 and BS2 may coordinate together to measure a D2D channel between the UEs. To that end, the base stations may allocate certain SRS resources (e.g., GUL resources) to the UEs for D2D-channel measurements. One UE can transmit SRS using the SRS resources, and the other UE can measure the SRS. Because the UEs are located in different cells (e.g., Cell 1 and Cell 2), BS1 and BS2 coordinate 712 with each other to determine the SRS resources allocated for measuring the D2D connection across the cells, and configure the UEs to measure the D2D channel based on the SRS.

Figure 8:
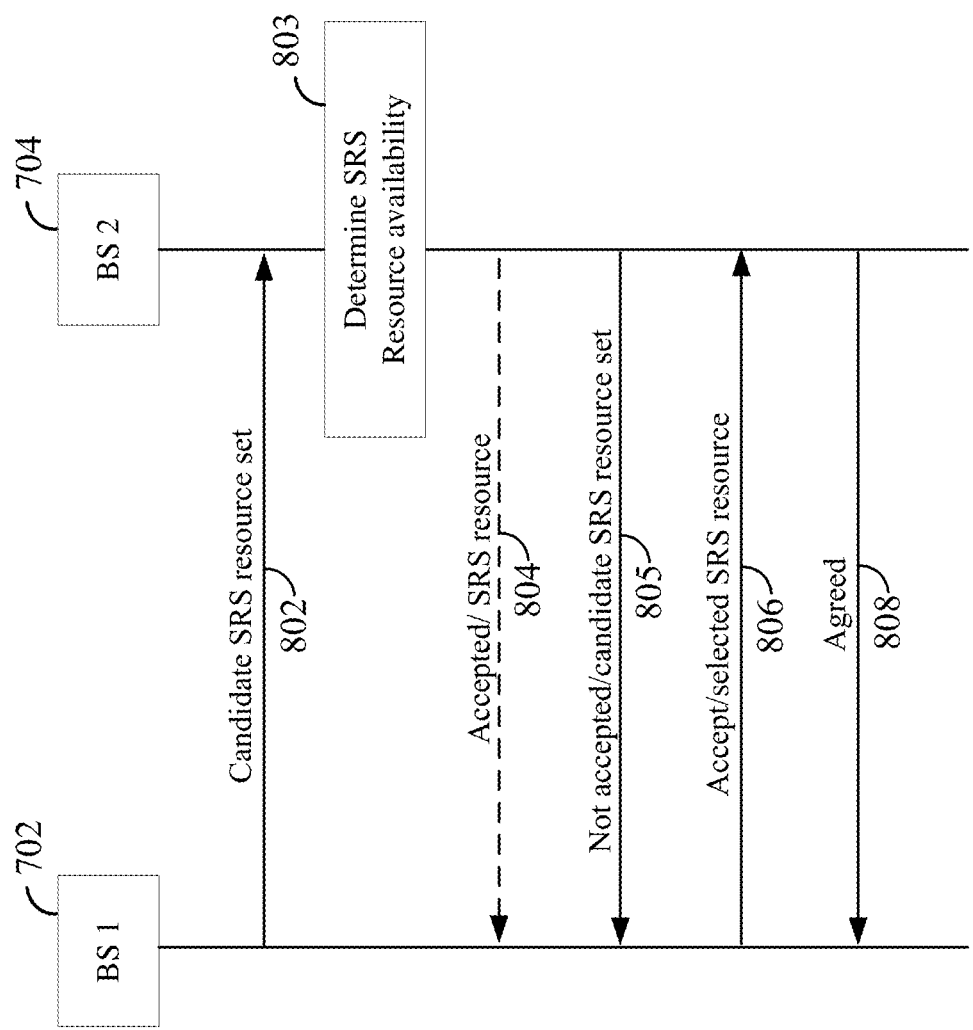
FIG. 8 is a diagram illustrating an exemplary base station coordination process for selecting sounding reference signal resources according to some aspects of the disclosure.

FIG. 8 is a diagram illustrating an exemplary base station coordination process for selecting SRS resources according to some aspects of the disclosure. The base stations (BS 1 702 and BS 2 704) coordinate with each other to synchronize SRS resources allocation within their respective cells for D2D communication across cells. Synchronizing SRS resources avoid scheduling conflict between the two cells when the base stations allocate, for example, GUL resources for SRS transmission. In some examples, the base stations may use the same GUL resources for D2D communication. BS1 may transmit a candidate SRS resource set 802 to BS2. The candidate SRS resource set 802 may include SRS resources that may be allocated to UE A 706 (see FIG. 7) for SRS transmissions. In response, BS2 determines, at block 803, whether the candidate SRS resource set 802 includes any SRS resource that may be available for UE B 708 (see FIG. 7) for SRS measurements. If BS2 finds an available SRS resource in the first candidate SRS resource set 802, BS2 may transmit an acceptance message 804 to BS1.

If BS2 determines that the candidate SRS resource set 802 does not include any SRS resource that is available in cell 2 for D2D channel measurements, BS2 transmits a not-accepted message 805 to BS1. In addition, the message may include a candidate SRS resource set that is available for UE B 708 in cell 2. In response, BS1 determines whether the candidate SRS resource set proposed by BS2 includes any SRS resource that is available to UE A 706 for SRS measurement in cell 1. If an available SRS resource is found, BS1 may transmit an acceptance message 806 to BS2. In addition, the acceptance message 806 may identify the specific selected SRS resource that is available for UE A. Then, BS2 may send a confirmation message 808 (e.g., "agreed") to BS1. At this stage, the base stations have reached an agreement on the SRS resource for measuring a D2D channel across cells.

In some cases, if BS1 does not find an available SRS resource in the candidate SRS resource set proposed by BS2, BS1 may propose another candidate SRS resource set and repeat the above-described process. If no agreement could be reached after a predetermined number of rounds, the base stations may give up setting up a D2D connection between the UEs.

Referring back to FIG. 7, after BS1 and BS2 coordinated to find an SRS resource (e.g., GUL resource) that is available in both cells, each base station transmits an SRS configuration to the UEs in the respective cells. For example, BS1 transmits an SRS Tx configuration 714 to UE A, and BS2 transmits an SRS Rx configuration 716 to UE B. The SRS Tx configuration 714 specifies the SRS resource (e.g., GUL resources) that UE A can use to transmit an SRS for D2D channel measurement. The SRS Rx configuration 716 specifies the SRS resource that UE B monitors and receives the SRS transmission from UE A. For example, UE A may transmit an SRS 718 using certain GUL resources specified in the SRS Tx configuration 714. Then, UE B monitors the same GUL resources for the anticipated SRS transmission from UE A.

Based on the received SRS, UE B may determine one or more parameters of the D2D channel, e.g., the proximity of the UEs, signal strength, and/or signal quality based on measurements of the SRS transmission 718. Then, UE B reports information relating to the SRS measurements 720 to BS2. In some examples, UE B or the base station may determine the proximity of the UEs, signal strength, and/or signal quality based on the SRS measurements. The proximity information may be a flag that is set to a first value and a second value. The first value indicates that the UEs are sufficiently close to each other for a reliable D2D connection. The second value indicates that the UEs are too far apart for a reliable D2D connection. The proximity information may be determined based on the signal strength and/or signal quality of the SRS.

With the SRS measurements information, the base stations can determine whether the UEs are close enough for a reliable D2D connection based on the SRS measurements and/or proximity information provided by UE B. If the base stations decide that the UEs are better served by a D2D connection, e.g., due to close proximity, the base stations may coordinate 722 with each other to determine the network resources (e.g., GUL resources) for the D2D connection between the UEs. In one example, the base stations can use a process similar to the SRS coordination process of FIG. 8 to determine the GUL resources for the D2D connection between the UEs. After the base stations have determined the D2D resources, the base stations transmit respective D2D grants and resource configurations 724 to the respective UEs. Then, the UEs can set up a D2D connection 726 based on the D2D grants and resource configurations.

Figure 9:
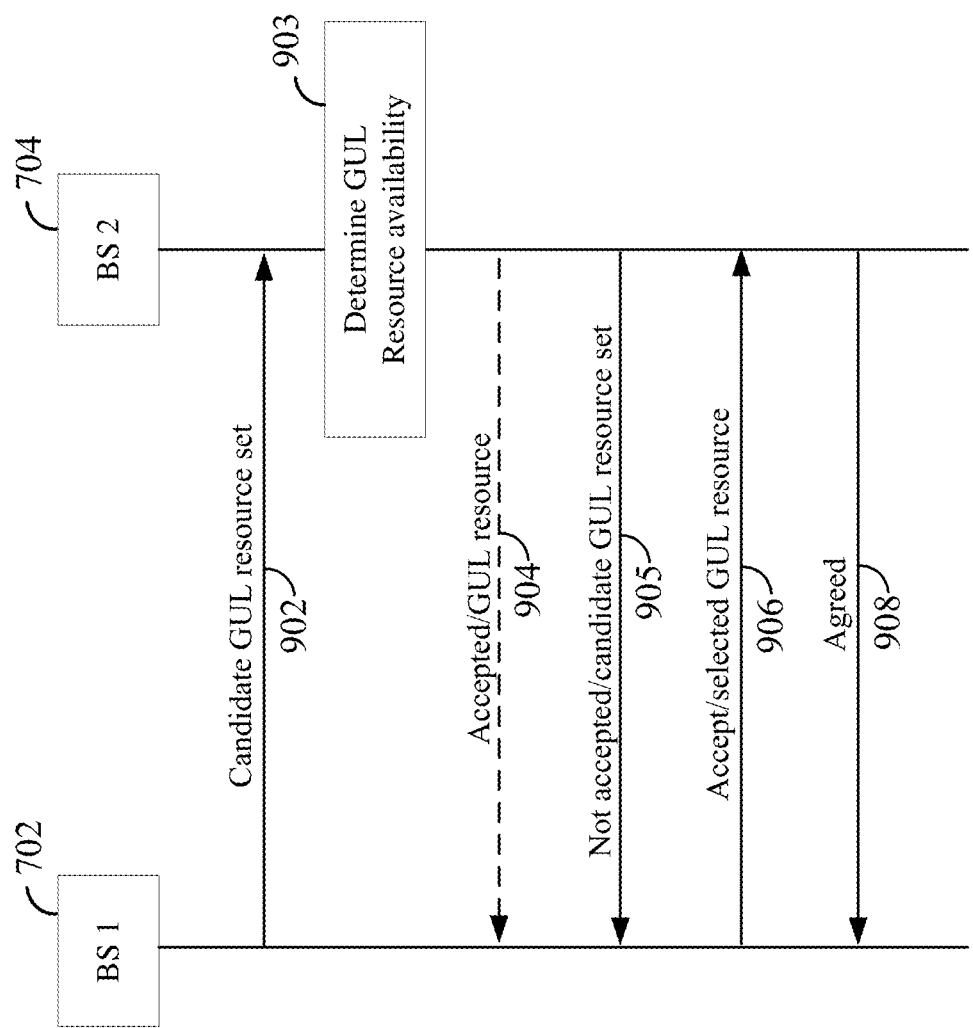
FIG. 9 is a diagram illustrating an exemplary base station coordination process for determining GUL resources for a D2D connection according to some aspects of the disclosure.

FIG. 9 is a diagram illustrating an exemplary base station coordination process for determining GUL resources for a D2D connection according to some aspects of the disclosure. Base stations (BS 1 702 and BS 2 704) can coordinate with each other to allocate common GUL resources for D2D communication across cells. BS1 may transmit a candidate GUL resource set 902 to BS2. The candidate GUL resource set 902 may include network resources that may be used by the UEs for D2D communication across cells. In response, BS2 determines, at block 903, whether the candidate GUL resource set 902 includes any resources (e.g., time, frequency, and/or spatial resources) that may be available for D2D communication across cells. If BS2 finds an available GUL resource in the first candidate GUL resource set 902, BS2 may transmit an acceptance message 904 to BS1.

In some cases, if BS2 determines that the candidate GUL resource set 902 does not include any resource that is available in cell 2 for D2D communication, BS may transmit a not-accepted message 905 to BS1. In addition, the message may include a candidate GUL resource set that is available for UE B in cell 2. In response, BS1 determines whether the candidate GUL resource set proposed by BS2 includes any resource that is available for UE A for D2D communication across cells. If an available resource (e.g., time, frequency, and/or spatial resources) is found, BS1 transmits an acceptance message 906 to BS2. In addition, the acceptance message 906 may identify the specific resource that is available for UE A. Then, BS2 may send a confirmation message 908 (e.g., "agreed") to BS1. At this stage, the base stations have reached an agreement on the common resource for D2D communication across cells.

In some cases, if BS1 does not find an available resource in the candidate GUL resource set 905 proposed by BS2, BS1 may propose another candidate GUL resource set and repeat the above-described process. If no agreement could be reached after a predetermined number of rounds, the base stations may give up setting up a D2D connection between the UEs.

Figure 10:
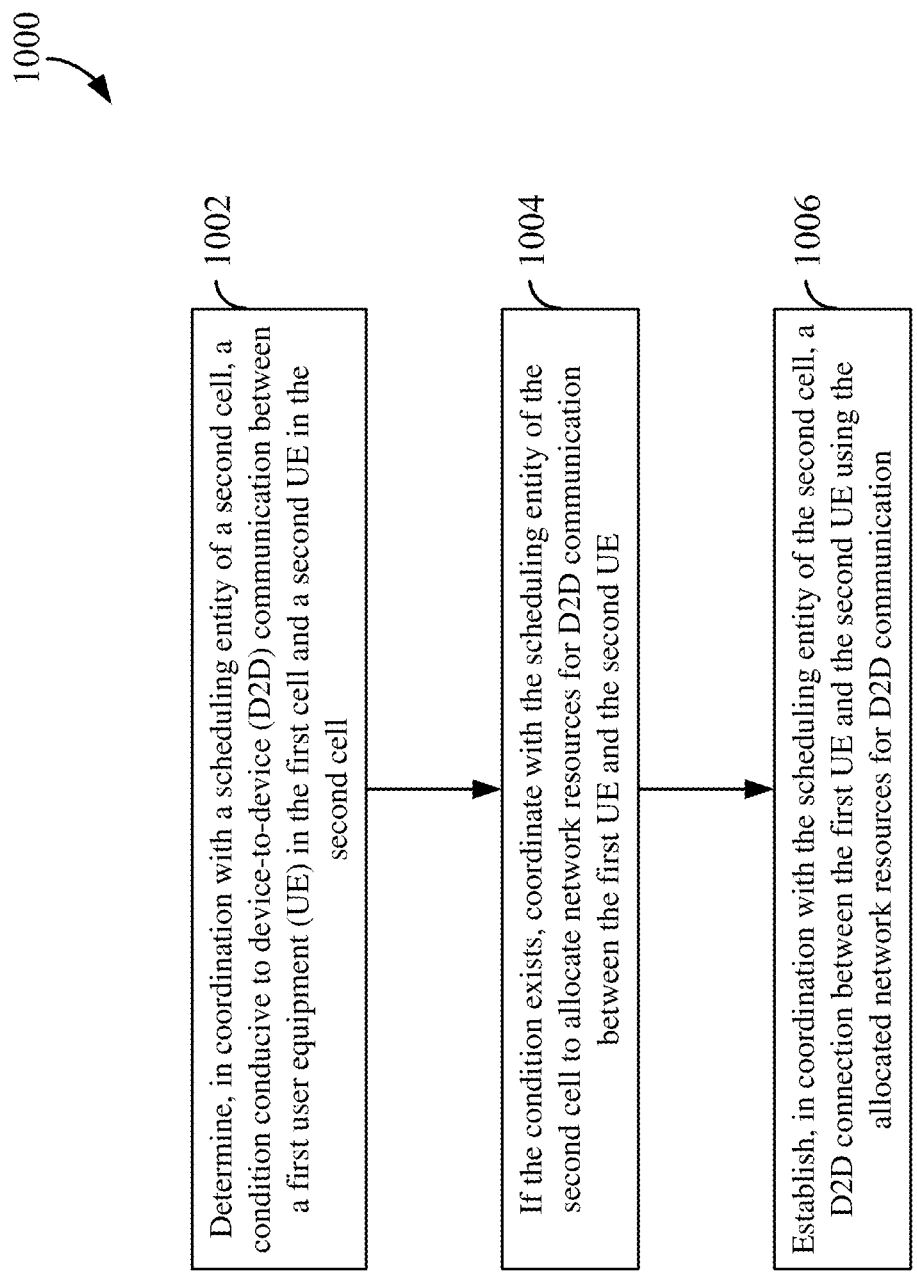
FIG. 10 is a flow chart illustrating an exemplary process for establishing a D2D connection across cells in accordance with some aspects of the present disclosure.

FIG. 10 is a flow chart illustrating an exemplary process 1000 for establishing a D2D connection across cells in accordance with some aspects of the present disclosure. As described below, some or all illustrated features may be omitted in a particular implementation within the scope of the present disclosure, and some illustrated features may not be required for implementation of all examples. In some examples, the process 1000 may be carried out by the scheduling entity 400 illustrated in FIG. 4. In some examples, the process 1000 may be carried out by any suitable apparatus or means for carrying out the functions or algorithm described below.

At block 1002, a first scheduling entity determines, in coordination with a second scheduling entity, a condition conducive to D2D communication between a first UE in a first cell and a second UE in a second cell. For example, the first scheduling entity may be BS1 of cell 1, and the second scheduling entity may be BS2 of cell 2 (see FIGS. 7-9). The condition conducive to D2D communication may be the proximity between the first UE and second UE. The first scheduling entity may use the processing circuit 440 and UL/DL communication circuit 442 to determine the proximity of the first UE to the second UE. For example, the first scheduling entity and the second scheduling entity may communicate via a backhaul connection to coordinate SRS measurements between the UEs. An exemplary process for determining the proximity of the UEs and/or measure the D2D channel is described above in relation to FIGS. 7 and 8.

At block 1004, if the condition exists, the first scheduling entity coordinates with the second scheduling entity to allocate network resources for D2D communication between the first UE and the second UE. For example, the first scheduling entity may determine that the condition exists when the SRS measurements are greater than a predetermined threshold or quality. In one example, the first UE sends an SRS and the second UE measures the SRS. From the SRS measurements, the second UE determines that the received signal-to-noise ratio (SNR) from the first UE is about 15 dB. If the predetermined threshold is 5 dB, then the second UE can determine that the first UE is in its proximity. The first scheduling entity and second scheduling entity may use the processes described in relation to FIG. 9 to allocate GUL resources for D2D communication between the UEs.

At block 1006, the first scheduling entity establishes, in coordination with the second scheduling entity, a D2D connection between the first UE and the second UE using the allocated network resources for D2D communication. For example, the first scheduling entity may use the D2D communication circuit 444 to coordinate with the second scheduling entity such that their respective UEs (first UE and second UE) use common GUL resources to perform D2D communication.

Figure 11:
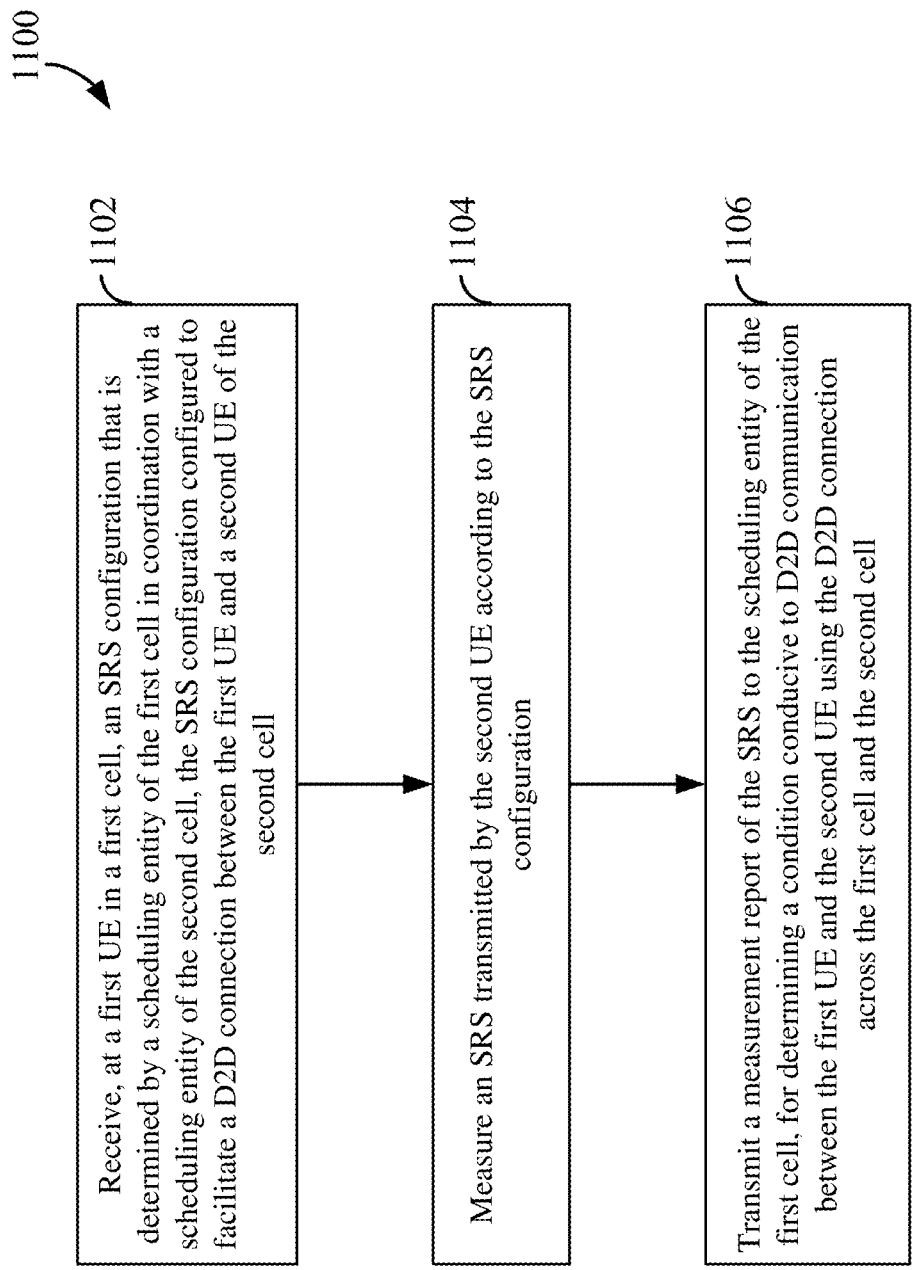
FIG. 11 is a flow chart illustrating another exemplary process for establishing a D2D connection across cells in accordance with some aspects of the present disclosure.

FIG. 11 is a flow chart illustrating an exemplary process 1100 for establishing a D2D connection across cells in accordance with some aspects of the present disclosure. As described below, some or all illustrated features may be omitted in a particular implementation within the scope of the present disclosure, and some illustrated features may not be required for implementation of all examples. In some examples, the process 1100 may be carried out by the scheduled entity 500 illustrated in FIG. 5. In some examples, the process 1100 may be carried out by any suitable apparatus or means for carrying out the functions or algorithm described below.

At block 1102, a first UE of a first cell receives an SRS configuration that is determined by a scheduling entity of the first cell in coordination with a scheduling entity of a second cell. The SRS configuration is configured to facilitate a D2D connection between the first UE and a second UE of the second cell. In one example, the first UE and second UE may be UE A and UE B, respectively, described above in relation to FIGS. 7-9. The first UE (e.g., UE A) may use the UL/DL communication circuit 542 to receive the SRS configuration from the scheduling entity (e.g., BS1).

At block 1104, the first UE measures an SRS transmitted by the second UE according to the SRS configuration. The SRS configuration may indicate the network resources (e.g., GUL resources) allocated to SRS transmission. For example, the first UE may use the D2D communication circuit 542 and/or UL/DL communication circuit 544 to monitor the specific GUL resources to receive and measure the SRS from the second UE.

At block 1106, the first UE transmits a measurement report of the SRS to the scheduling entity of the first cell, for determining a condition conducive to D2D communication between the first UE and the second UE using the D2D connection across the first cell and the second cell. For example, the first UE may use the UL/DL communication circuit 544 to transmit the SRS measurement report to the scheduling entity. The measurement report may include the SRS measurements. Based on the SRS measurements, the scheduling entity can determine the proximity of the UEs. Alternatively, the first UE may determine the proximity between the UEs and include the result in the measurement report. When the first UE is in proximity to the second UE, this condition is conducive to D2D communication, for example, using GUL resources.

In one configuration, the apparatus 400 for wireless communication includes means for receiving an SRS configuration that is determined by a scheduling entity of a first cell in coordination with a scheduling entity of a second cell, the SRS configuration configured to facilitate a D2D connection between a first UE of the first cell and a second UE of the second cell; means for measuring an SRS transmitted by the second UE according to the SRS configuration; and means for transmitting a measurement report of the SRS to the scheduling entity of the first cell, for determining a condition conducive to D2D communication between the first UE and the second UE using the D2D connection across the first cell and the second cell. In one aspect, the aforementioned means may be the processor(s) 404 shown in FIG. 4 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, 6, 7, 8, and/or 9, and utilizing, for example, the processes and/or algorithms described herein in relation to FIGS. 6-11.

In one configuration, the apparatus 500 for wireless communication includes means for receiving an SRS configuration that is determined by a scheduling entity of a first cell in coordination with a scheduling entity of a second cell, the SRS configuration configured to facilitate a D2D connection between a first UE of the first cell and a second UE of the second cell; means for measuring an SRS transmitted by the second UE according to the SRS configuration; and means for transmitting a measurement report of the SRS to the scheduling entity of the first cell, for determining a condition conducive to D2D communication between the first UE and the second UE using the D2D connection across the first cell and the second cell.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, 6, 7, 8, and/or 9, and utilizing, for example, the processes and/or algorithms described herein in relation to FIGS. 6-11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of establishing device-to-device (D2D) wireless communication across a first cell and a second cell, comprising:

receiving, at a first user equipment (UE) in the first cell, a sounding reference signal (SRS) configuration that is identified by a first scheduling entity of the first cell in coordination with a second scheduling entity of the second cell, the SRS configuration configured to indicate grant-free uplink (GUL) resources available to a second UE of the second cell;

measuring an SRS transmitted by the second UE using the GUL resources according to the SRS configuration; and transmitting a measurement report of the SRS to the first scheduling entity of the first cell, for determining a condition conducive to D2D communication between the first UE and the second UE using the GUL resources.

2. The method of claim 1, further comprising:
  determining the condition conducive to D2D communication between the first UE and the second UE based on measurements of the SRS.

3. The method of claim 2, wherein the condition conducive to D2D communication comprises information on the proximity of the first UE to the second UE.

4. The method of claim 1, wherein the measurement report indicates the condition conducive to D2D communication between the first UE and the second UE.

5. The method of claim 1, further comprising:
  receiving a D2D configuration that is determined by the first scheduling entity of the first cell in coordination with the second scheduling entity of the second cell; and
  establishing a D2D connection using the GUL resources between the first UE and the second UE based on the D2D configuration.

6. The method of claim 5, wherein the D2D configuration comprises an allocation of the GUL resources in the first cell and the second cell.

7. A first user equipment (UE) of a first cell for wireless communication, comprising:
  a communication interface configured for wireless communication;
  a memory; and
  a processor coupled with the communication interface and the memory,
  wherein the processor and the memory are configured to:
  receive a sounding reference signal (SRS) configuration that is identified by a first scheduling entity of the first cell in coordination with a second scheduling entity of a second cell, the SRS configuration configured to indicate grant-free uplink (GUL) resources available to a second UE of the second cell;
  measure an SRS transmitted by the second UE using the GUL resources according to the SRS configuration; and
  transmit a measurement report of the SRS to the first scheduling entity of the first cell, for determining a condition conducive to D2D communication between the first UE and the second UE using the GUL resources.

8. The first UE of claim 7, wherein the processor and the memory are further configured to:
  determine the condition conducive to D2D communication between the first UE and the second UE based on measurements of the SRS.

9. The first UE of claim 8, wherein the condition conducive to D2D communication comprises information on the proximity of the first UE to the second UE.

10. The first UE of claim 7, wherein the measurement report indicates the condition conducive to D2D communication between the first UE and the second UE.

11. The first UE of claim 7, wherein the processor and the memory are further configured to:
  receive a D2D configuration that is determined by the first scheduling entity of the first cell in coordination with the second scheduling entity of the second cell; and
  establish a D2D connection using the GUL resources between the first UE and the second UE based on the D2D configuration.

12. The first UE of claim 11, wherein the D2D configuration comprises an allocation of the GUL resources in the first cell and the second cell.

13. A first user equipment (UE) of a first cell, comprising:
  means for receiving a sounding reference signal (SRS) configuration that is identified by a first scheduling entity of the first cell in coordination with a second scheduling entity of a second cell, the SRS configuration configured to indicate grant-free uplink (GUL) resources available to a second UE of the second cell;
  means for measuring an SRS transmitted by the second UE using the GUL resources according to the SRS configuration; and
  means for transmitting a measurement report of the SRS to the first scheduling entity of the first cell, for determining a condition conducive to D2D communication between the first UE and the second UE using the GUL resources.

14. The first UE of claim 13, further comprising:
  means for determining the condition conducive to D2D communication between the first UE and the second UE based on measurements of the SRS.

15. The first UE of claim 14, wherein the condition conducive to D2D communication comprises information on the proximity of the first UE to the second UE.

16. The first UE of claim 13, wherein the measurement report indicates the condition conducive to D2D communication between the first UE and the second UE.

17. The first UE of claim 13, further comprising:
  means for receiving a D2D configuration that is determined by the first scheduling entity of the first cell in coordination with the second scheduling entity of the second cell; and
  means for establishing a D2D connection using the GUL resources between the first UE and the second UE based on the D2D configuration.

18. The first UE of claim 17, wherein the D2D configuration comprises an allocation of the GUL resources in the first cell and the second cell.

* * * * *